US011714779B2

(12) United States Patent
Morshed et al.

(10) Patent No.: US 11,714,779 B2
(45) Date of Patent: Aug. 1, 2023

(54) NOC RELAXED WRITE ORDER SCHEME

(71) Applicant: XILINX, INC., San Jose, CA (US)

(72) Inventors: Abbas Morshed, Los Altos, CA (US); Ygal Arbel, Morgan Hill, CA (US); Eun Mi Kim, San Jose, CA (US)

(73) Assignee: XILINX, INC., San Jose, CA (US)

( * ) Notice: Subject to any disclaimer, the term of this patent is extended or adjusted under 35 U.S.C. 154(b) by 373 days.

(21) Appl. No.: 16/830,142

(22) Filed: Mar. 25, 2020

(65) Prior Publication Data

US 2021/0303508 A1 Sep. 30, 2021

(51) Int. Cl.
*G06F 15/78* (2006.01)
*G06F 5/10* (2006.01)
*G06F 9/38* (2018.01)
*G06F 13/40* (2006.01)

(52) U.S. Cl.
CPC ............ *G06F 15/7825* (2013.01); *G06F 5/10* (2013.01); *G06F 9/38* (2013.01); *G06F 13/4027* (2013.01); *G06F 2205/064* (2013.01); *G06F 2213/0038* (2013.01)

(58) Field of Classification Search
CPC .......... G06F 5/10; G06F 15/7825; G06F 9/38; G06F 13/4027; G06F 2205/064; G06F 2213/0038
See application file for complete search history.

(56) References Cited

U.S. PATENT DOCUMENTS

| | | | |
|---|---|---|---|
| 6,078,528 A | 6/2000 | Johnson et al. | |
| 7,000,060 B2 | 2/2006 | Shah et al. | |
| 7,233,168 B1 | 6/2007 | Simkins | |
| 7,804,719 B1 | 9/2010 | Chirania et al. | |
| 8,116,119 B1 | 2/2012 | Peng et al. | |
| 9,489,304 B1 * | 11/2016 | Swarbrick | G06F 13/00 |
| 2003/0145136 A1 * | 7/2003 | Tierney | G06F 13/1663 712/E9.048 |
| 2004/0064627 A1 * | 4/2004 | Shah | G06F 13/4031 710/310 |
| 2004/0100900 A1 * | 5/2004 | Lines | G06F 13/4247 370/229 |

(Continued)

OTHER PUBLICATIONS

Xu, Zheng, et al., "Resilient Reorder Buffer Design for Network-on-chip", 20th International Symposium on Quality Electronic Design (ISQED), IEEE, Mar. 6, 2019, pp. 92-97.

*Primary Examiner* — Nimesh G Patel
(74) *Attorney, Agent, or Firm* — Patterson + Sheridan, LLP

(57) ABSTRACT

Embodiments herein describe a SoC that includes a NoC that supports both strict and relax ordering requests. That is, some applications may require strict ordering where requests transmitted from the same ingress logic to different egress logic blocks are performed sequentially. However, other applications may not require strict ordering, such as interleaved writes to memory. In those applications, relax ordering can be used were the same ingress logic block can transmit multiple requests to different egress logic blocks in parallel. For example, an ingress logic block may receive a first request that is indicated as being a relaxed ordered request. After transmitting the request to an egress logic block, the ingress logic block may receive a second request. The ingress logic block can transmit the second request to a different egress logic block without waiting for a response for the first request.

20 Claims, 10 Drawing Sheets

(56) References Cited

U.S. PATENT DOCUMENTS

| | | | |
|---|---|---|---|
| 2014/0281243 A1* | 9/2014 | Shalf | G06F 12/0811 |
| | | | 711/119 |
| 2015/0043575 A1* | 2/2015 | Kumar | H04L 12/185 |
| | | | 370/390 |
| 2019/0266010 A1 | 8/2019 | Tune et al. | |

* cited by examiner

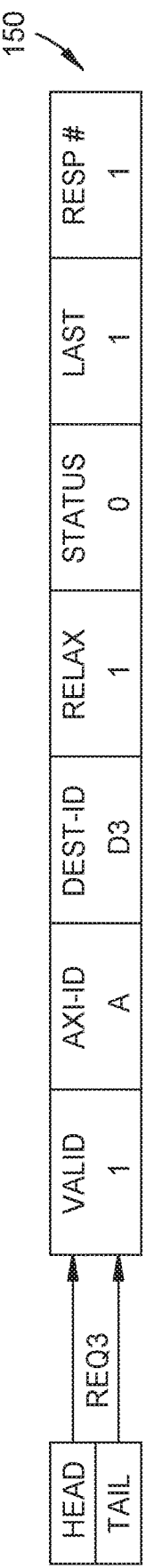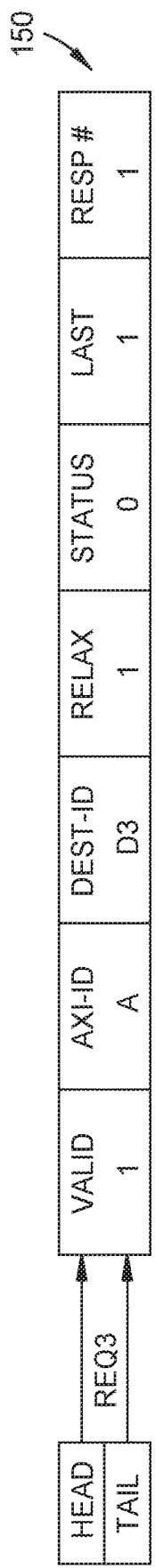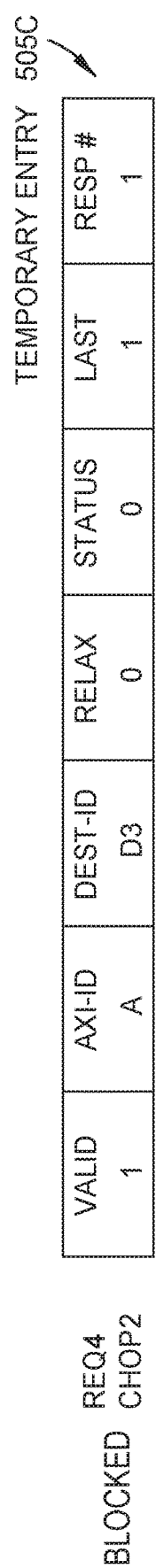
FIG. 5I
FIG. 5J

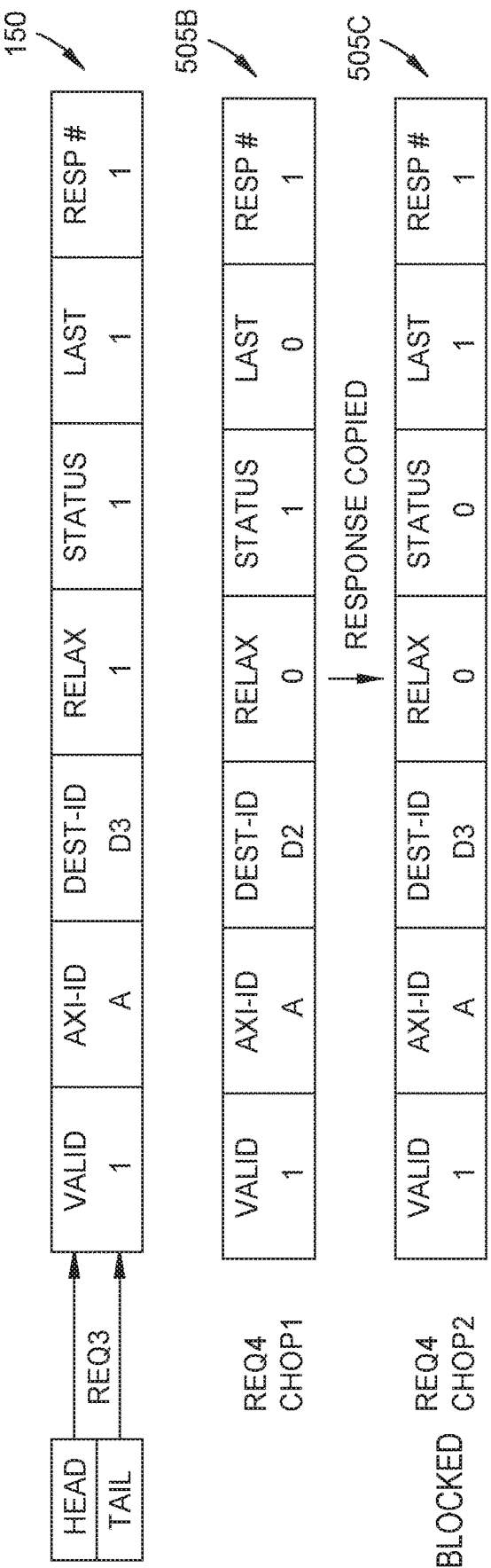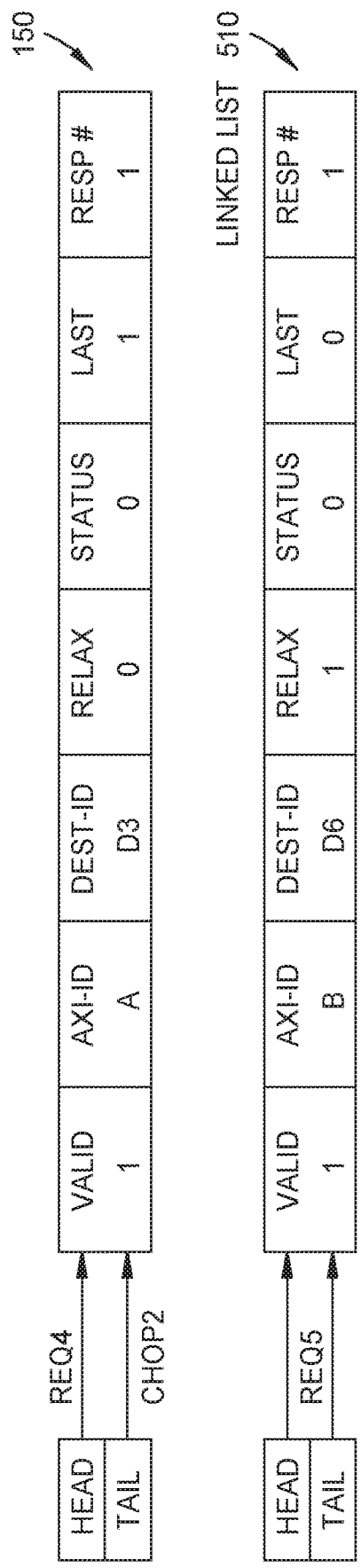
FIG. 5K
FIG. 5L

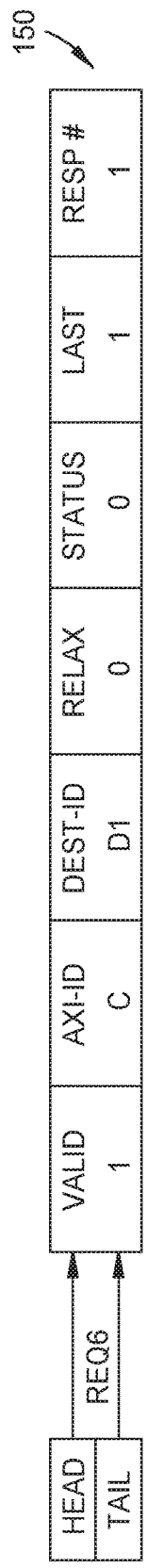
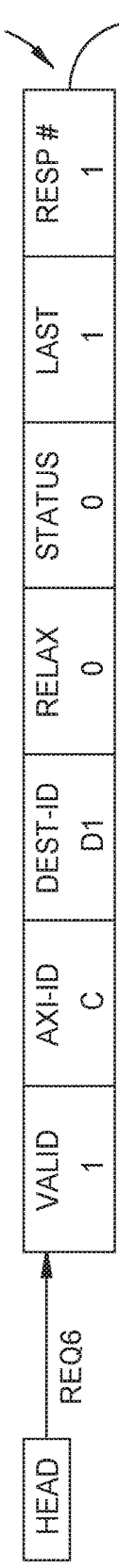
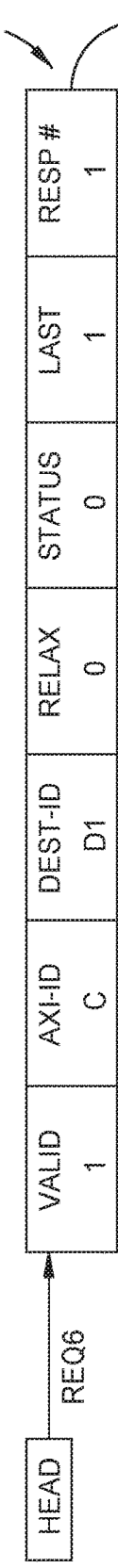
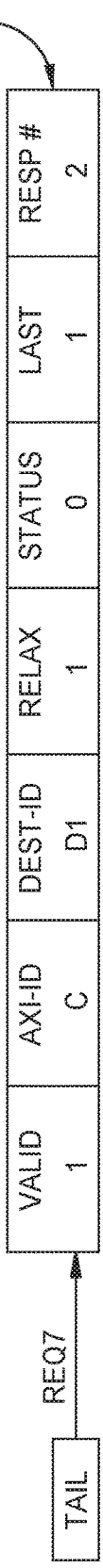
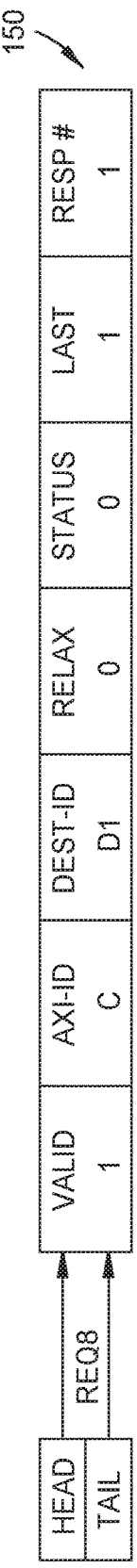
FIG. 5M  FIG. 5N  FIG. 5O  FIG. 5P

NOC RELAXED WRITE ORDER SCHEME

TECHNICAL FIELD

Examples of the present disclosure generally relate to performing strict and relaxed ordered requests using a network on a chip (NoC).

BACKGROUND

A system on chip (SoC) (e.g., a field programmable gate array (FPGA), a programmable logic device (PLD), or an application specific integrated circuit (ASIC)) can contain a packet network structure known as a network on a chip (NoC) to route data packets between logic blocks in the SoC—e.g., programmable logic blocks, processors, memory, and the like.

The NoC can include ingress logic blocks (e.g., masters) that execute read or write requests to egress logic blocks (e.g., servants). An ingress logic block can receive multiple requests. If strict ordering is required, the ingress logic block may have to wait until a response to the first request is received from a first egress logic block before a second request can be transmitted to a different egress logic block. That is, strict ordering requires the responses to different egress logic blocks to occur sequentially. As such, this can cause substantial delay where the ingress logic block waits for a response from each egress logic block before issuing another read or write request.

SUMMARY

Techniques for defining relaxed order requests are described. One example is an integrated circuit that includes a first hardware entity, a second hardware entity, and a network on a chip (NoC) that provides connectivity between the first and second hardware entities. The NoC includes an ingress logic block coupled to the first hardware entity and an egress logic block coupled to the second hardware entity where the ingress logic block includes a write tracker configured to receive a first request from the first hardware entity to write data to the second hardware entity and determine whether the first request is one of a relaxed ordered request or a strict ordered request, wherein the relaxed ordered request can be executed in parallel with a subsequently received response while the strict ordered request cannot be executed in parallel with a subsequently received response that has a different destination than the first request.

One example described herein is a method that includes receiving a first request from a first hardware entity to write data to a second hardware entity where the first hardware entity and the second hardware entity are communicatively coupled by a NoC and determining, at an ingress logic block in the NoC, whether the first request is one of a relaxed ordered request or a strict ordered request, where the relaxed ordered request can be executed in parallel with a subsequently received response while the strict ordered request cannot be executed in parallel with a subsequently received response that has a different destination than the first request.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
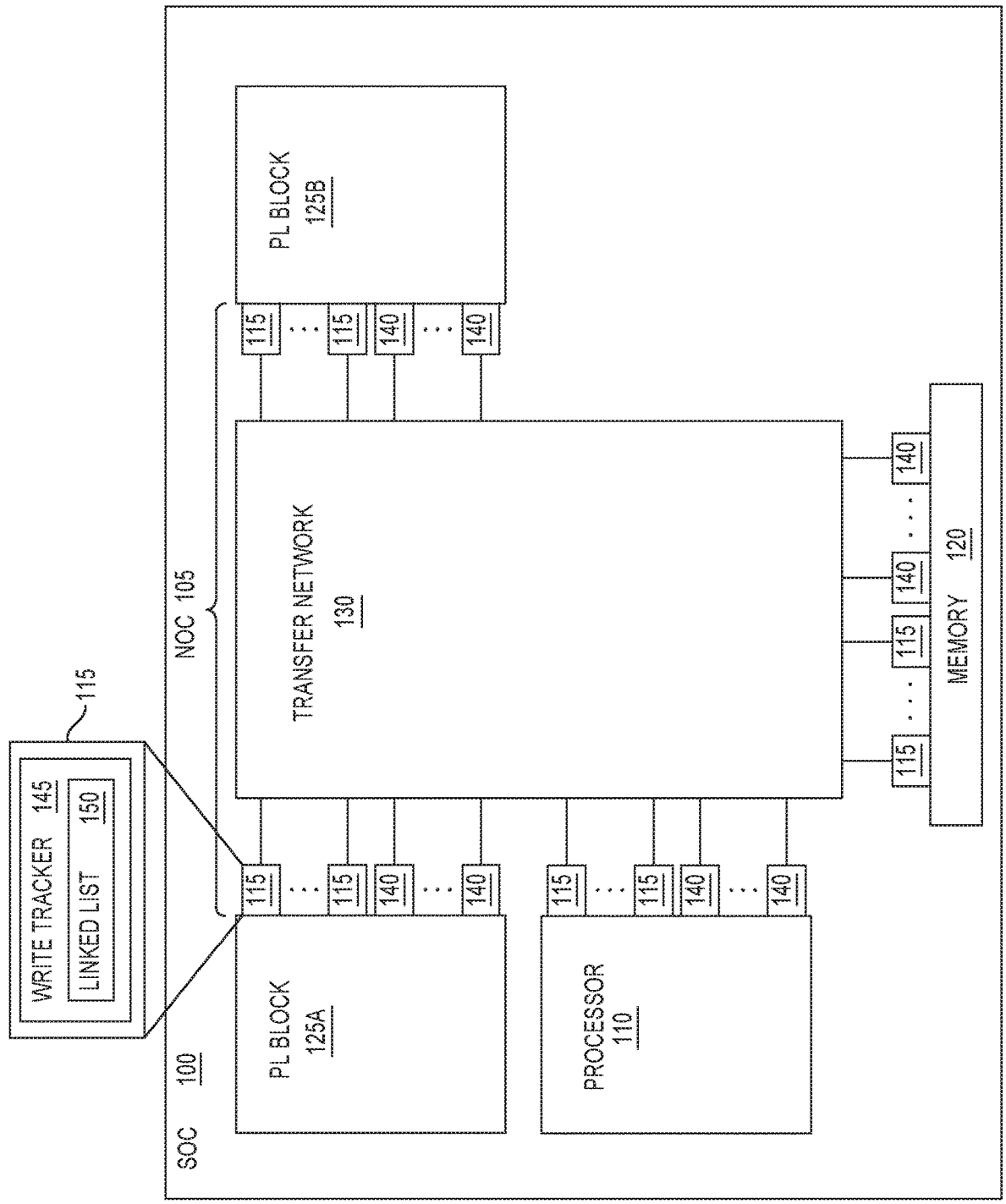
FIG. 1 is a block diagram of a SoC containing a programmable NoC, according to an example.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the description or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Embodiments herein describe a SoC that includes a NoC that supports both strict and relaxed ordering requests. That is, some applications may require strict ordering (such as many processor type operations) where requests transmitted from the same ingress logic block (also referred to as a NoC Master Unit (NMU)) to different egress logic blocks (also referred to as NoC Slave Units or NoC Servant Units (NSU)) are performed sequentially. However, other applications may not require strict ordering, such as interleaved writes to memory. In those applications, relaxed ordering can be used were the same ingress logic block can transmit multiple requests to different egress logic blocks in parallel. For example, an ingress logic block may receive a first request that is indicated as being a relaxed ordered request. After transmitting the request to a corresponding egress logic block, the ingress logic block may receive a second request to the same or different destination as the first request. The ingress logic block can transmit the second request to its destination without waiting for a response for the first request. In this manner, designating requests as relaxed ordering can avoid the delay caused by strict ordering.

In one embodiment, the ingress logic block still returns completion notices to the hardware entity submitting the request in order. Continuing the example above, if the second request completes before the first request (e.g., the ingress logic block receives a response from the egress logic block corresponding to the second request before receiving a response from the egress logic block corresponding to the first request), the ingress logic block waits to inform the entity submitting the request that the second request is complete until after the first request has completed. However, this may be a protocol specific requirement, and thus, may depend on the communication protocol used to transmit data on the NoC.

FIG. 1 is a block diagram of the SoC 100 containing a NoC 105, according to an example. In one embodiment, the SoC 100 is implemented using a single integrated circuit (IC). In one embodiment, the SoC 100 includes a mix of hardened and programmable logic. For example, the NoC 105 may be formed using hardened circuitry rather than programmable circuitry so that its footprint in the SoC 100 is reduced.

As shown, the NoC 105 interconnects a programmable logic (PL) block 125A, a PL block 125B, a processor 110, and a memory 120. That is, the NoC 105 can be used in the SoC 100 to permit different hardened and programmable circuitry elements in the SoC 100 to communicate. For example, the PL block 125A may use one ingress logic block 115 (e.g., a NMU) to communicate with the PL block 125B and another ingress logic block 115 to communicate with the processor 110. However, in another embodiment, the PL block 125A may use the same ingress logic block 115 to communicate with both the PL block 125B and the processor 110 (assuming the endpoints use the same communication protocol). The PL block 125A can transmit the data to the respective egress logic blocks 140 (e.g., NSUs) for the PL block 125B and the processor 110 which can determine whether the data is intended for them based on an address (if using a memory mapped protocol) or a destination ID (if using a streaming protocol).

The PL block 125A may include egress logic blocks 140 for receiving data transmitted by the PL block 125B and the processor 110. In one embodiment, the hardware logic blocks are able to communicate with all the other hardware logic blocks that are also connected to the NoC 105, but in other embodiments, the hardware logic blocks may communicate with only a sub-portion of the other hardware logic blocks connected to the NoC 105. For example, the memory 120 may be able to communicate with the PL block 125A but not with the PL block 125B.

As described above, the ingress and egress logic blocks 115, 140 may all use the same communication protocol to communicate with the PL blocks 125, the processor 110, and the memory 120, or can use different communication protocols. For example, the PL block 125A may use a memory mapped protocol to communicate with the PL block 125B while the processor 110 uses a streaming protocol to communicate with the memory 120. In one embodiment, a transfer network 130 in the NoC 105 can support multiple protocols.

In one embodiment, the SoC 100 is an FPGA which configures the PL blocks 125 according to a user design. That is, in this example, the FPGA includes both programmable and hardened logic blocks. However, in other embodiments, the SoC 100 may be an ASIC that includes only hardened logic blocks. That is, the SoC 100 may not include the PL blocks 125. Even though in that example the logic blocks are non-programmable, the NoC 105 may still be programmable so that the hardened logic blocks—e.g., the processor 110 and the memory 120 can switch between different communication protocols, change data widths at the interface, or adjust the frequency.

The NoC 105 permits entities (e.g., the PL blocks 125, the processor 110, and the memory 120) to submit write requests using strict or relaxed ordering. For example, the processor 110 may always use strict ordering when transmitting data across the NoC 105. However, the PL block 125A may include memory controllers that can use relaxed ordering to store data in the memory 120. Using the embodiments herein, a user can customize the SoC 100 so that certain writes facilitated by the NoC 105 are done using strict ordering or relaxed ordering.

Each of the ingress logic blocks 115 can include a write tracker 145 that tracks the write requests transmitted by the ingress logic blocks to the egress logic blocks 140. The write tracker includes the linked list 150 and all the status information about the write requests and received write responses. In one embodiment, the write tracker can handle a maximum number of requests (e.g., 64 requests) but this number can depend on the implementation.

The write tracker 145 includes a linked list 150 which has a head and a tail. The write requests can be added to the linked list 150 as they are received. Further, as discussed below, the write requests may be added to the linked list 150 depending on whether they are strict ordered or relaxed ordered requests. For example, if the linked list 150 already includes a strict ordered request, a subsequently received strict request may be blocked (i.e., not added to the linked list 150). The details for explaining how requests are added and removed from the linked list 150 are described in FIGS. 3-5.

Figure 2:
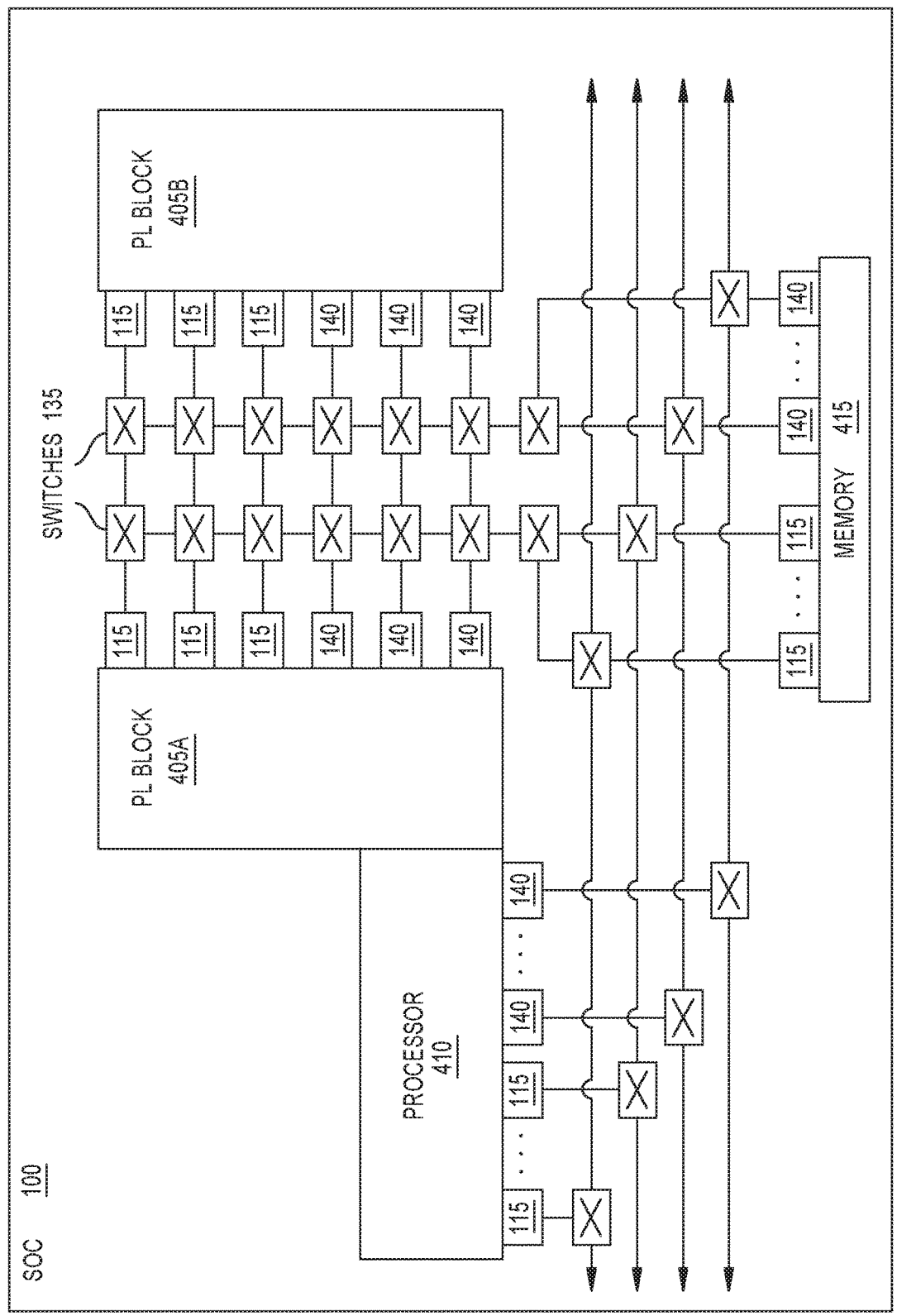
FIG. 2 illustrates an exemplary layout of a SoC containing a programmable NoC, according to an example.

FIG. 2 illustrates an exemplary layout of a SoC 100 containing a NoC 105, according to an example. Like in FIG. 1, FIG. 2 illustrates the PL blocks 125, the processor 110, the memory 120, and the ingress and egress logic blocks 115 and 140. In addition, FIG. 2 illustrates the connections and various switches 135 (labeled as boxes with "X") used by the transfer network in the NoC to route packets between the ingress and egress logic blocks 115 and 140.

The locations of the PL blocks 125, the processor 110, and the memory 120 in the physical layout of the SoC 100 are just one example of arranging these hardware elements. Further, the SoC 100 can include more hardware elements than shown. For instance, the SoC 100 may include additional PL blocks, processors, and memory that are disposed at different locations on the SoC 100. Further, the SoC 100 can include other hardware elements such as I/O modules and a memory controller which may, or may not, be coupled to the NoC 105 using respective ingress and egress logic blocks 115 and 140. For example, the I/O modules may be disposed around a periphery of the SoC 100.

Figure 3:
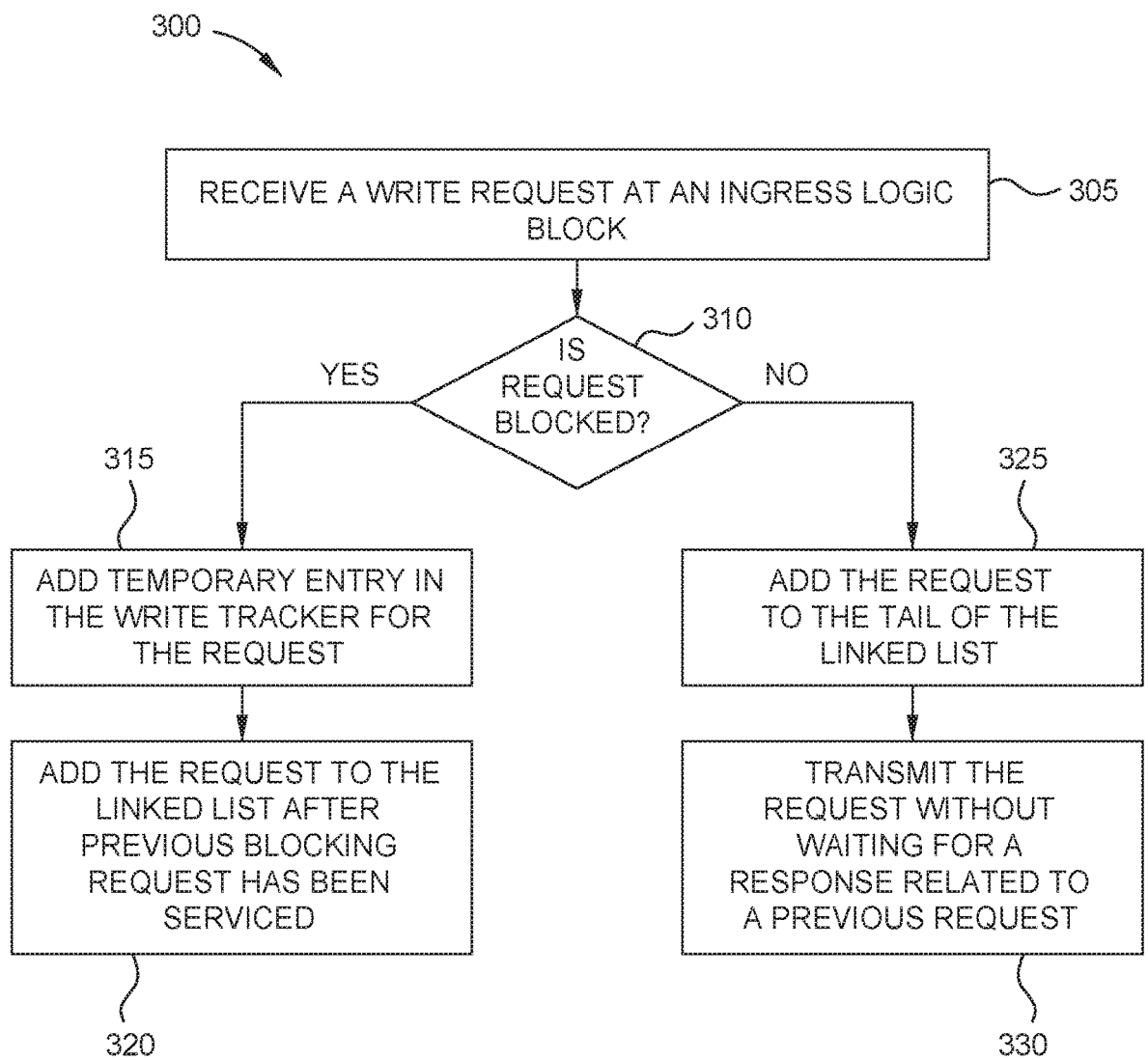
FIG. 3 is a flowchart for servicing write requests using a linked list, according to an example.

FIG. 3 is a flowchart of a method 300 for servicing write requests using a linked list, according to an example. At block 305 an ingress logic block receives a write request from a hardware entity in the SoC (e.g., a PL block, processor, memory controller, I/O module, etc.). For ease of explanation, the write request is simply referred to as "the request" below.

At block 310, the ingress logic block determines whether the request is blocked. A request can be blocked for multiple reasons. In one example, the linked list may already include a strict ordered request that is not yet complete. If the request received at block 305 is to a different destination than the strict ordered request already in the linked list, then the new request is blocked if it is also a strict ordered request. In another example, a request may be subdivided into different "chops" (e.g., a 512-byte write request is divided into two 256-byte chops). If the chops of a strict ordered request are for two different destinations, the second chop may be blocked while the first chop is transmitted to its destination. That is, the first chop can be transmitted to its egress logic block while the second chop has to wait. The memory system can also have a mode bit which can force a strict request to wait until all relax-ordered requests, with the same AXI ID, are retired from the write tracker. These examples are not intended to cover all scenarios where a request would be (at least partially) blocked by the ingress logic block. The types of scenarios may vary depending on the implementation of the NoC and the communication protocol being used.

There are also many situations where requests are not blocked. For example, the Advanced eXtensible Interface (AXI) communication protocol permits requests with different AXI IDs to occur in parallel (e.g., without strict ordering). Thus, a strict or relaxed ordered request to the same or different destination as another request that has a different AXI ID would not be blocked. Furthermore. AXI permits requests with the same AXI ID and the same destination ID (e.g., the same destination egress logic block) to occur in parallel. Thus, even if the linked list has a previous strict ordered request that has the same destination as a new strict ordered request received at block 305, the new request is not blocked. Stated oppositely, a previously received strict ordered request blocks a new strict ordered request (with the same AXI ID) only if the new request has a different destination as the previous received request. Further, if the previous request is a relaxed ordered request, a new request (whether strict order or relaxed order) is not blocked by the previous request regardless whether the new request has the same destination or a different destination. Again, the memory system can also have a mode bit which forces a strict request to wait until all relax-ordered requests, with the same AXI ID, are retired from the write tracker. These examples are not intended to cover all scenarios where a request would be not blocked at the ingress logic block. FIGS. 5A-5L illustrate many different examples where requests are block and unblocked by previously received requests.

If the request is blocked at block 310, the method 300 proceeds to block 315 where the ingress logic block adds a temporary entry in the write tracker for the request. That is, the ingress logic block does not add an entry to the linked list but may nonetheless store a temporary entry for the request where the request can wait until it is unblocked.

At block 320, the ingress logic block adds the request to the linked list after a previous blocking request has been serviced—i.e., is complete. For example, if a new received request is blocked by a previously received strict ordered request, after a response is received from the destination corresponding to the previously received request, the ingress logic block can add the temporary entry for the new request to the linked list and transmit the request to its destination egress logic block.

Returning to block 310, if the request is not blocked the method 300 proceeds to block 325 where the ingress logic block adds an entry corresponding to the request to the tail of the linked list. If the request is the only request currently being tracked in the linked list, its corresponding entry will be both the head and the tail of the linked list.

At block 330, the ingress logic block transmits the request without waiting for a response related to a previous request. That is, if there are other entries in the linked list corresponding to previously received requests, the ingress logic block can nonetheless transmit the newly received request to its destination without waiting for a response to the previous received request(s). In this manner, relaxed ordering can reduce delay between requests. That is, if a previous request is relaxed ordering, a new request can be transmitted without waiting for the ingress logic block to receive a response to the previous request. In contrast, if the previous request is strict ordering, a new strict order request that has the same AXI ID but a different destination ID is blocked. Thus, by providing the user with the ability to designate which requests are strict ordering and which are relaxed ordering, the user can avoid the delay caused by strict ordering which blocks requests with the same AXI ID but different destination IDs.

There are multiple different ways to designate a request as relaxed ordering or strict ordering. In one embodiment, a new bit, referred to below as a RELAX bit, is added to each entry in an address map table maintained in the ingress logic blocks. This bit indicates whether the address region requires enforcement of strict or relaxed AXI write Order rule. That is, the user can designate which address regions should follow strict or relaxed ordering and the entity submitting the request (e.g., a PL block, processor, or memory controller) can assign the relax_order_en bit accordingly. In another embodiment, two bits of AWUSER signals of AXI write address channel is used to force either Relaxed Write Order or Strict Write Order. In yet another embodiment, the relax_order_en bit is also is added to the write tracker entry data structure in the ingress logic block. This bit is set based on the look up address map table entry (or a remap operation). In another embodiment, another bit can be added to enforce blocking between previous relaxed order request and new strict order request (i.e., a block_en bit), which is discussed below.

To illustrate how the RELAX bit can be used, in one embodiment, when a new strict AXI write request arrives at an ingress logic block, and its dest-ID/RELAX bit is selected by the address map, the write tracker checks whether the linked list contains any VALID entries with matching AXI-ID and RELAX bit set to 0 (indicating the previous request is a strict ordering request). If any match is found with a different dest-ID of the new strict ordered request, the new request is blocked until the matching entry receives all its NoC responses and is retired—i.e., removed from the linked list. In contrast, when a new relaxed AXI write request arrives at an ingress logic block, and its dest-ID/RELAX bit is selected by the address map, the write tracker does not block the write request from being sent to NoC.

Figure 4:
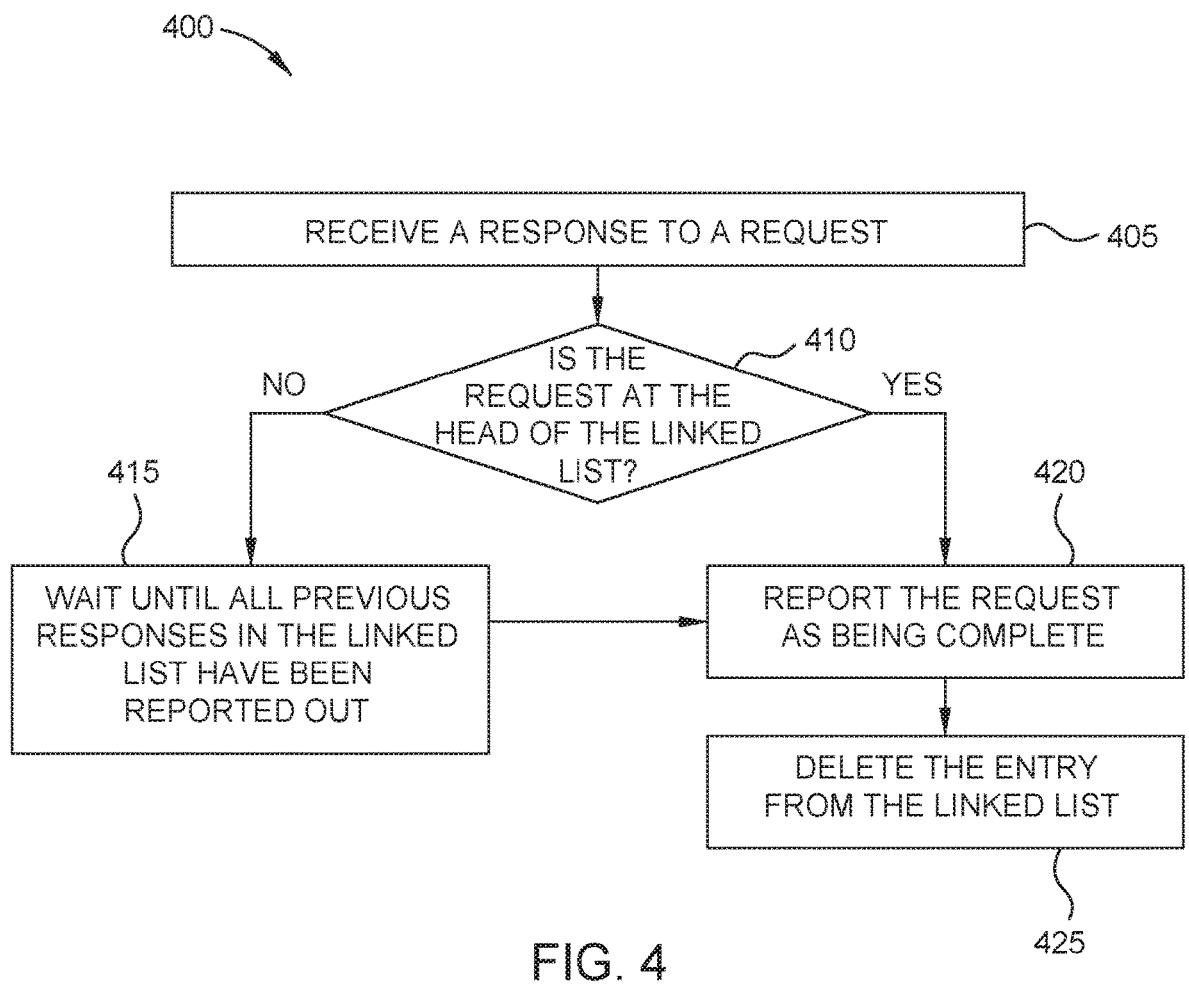
FIG. 4 is a flowchart for removing write requests from a linked list, according to an example.

FIG. 4 is a flowchart of a method 400 for removing requests from a linked list, according to an example. At block 405, the ingress logic block receives a response to a request from an egress logic block (i.e., the destination of the request).

At block 410, the ingress logic block determines whether an entry corresponding to the request is at the head of the linked list. That is, assuming the linked list only stores requests with the same AXI ID, the write tracker determines whether the request is the oldest request stored on the linked list (e.g., the request was received before all the other requests represented in the linked list). As mentioned above, at least for AXI, the ingress logic block informs the entity that submitted the request in the order the requests were received. Thus, if a request in the linked list finishes before a previously received request, the method 400 moves to block 415 where the write tracker waits until all previous responses in the linked list have been reported out.

Once that is done (or if the response was at the head of the linked list), the method 400 proceeds to block 420 where the write tracker reports the request as being complete—i.e., the request is retired.

At block 425, the write tracker deletes the entry from the linked list. That is, the head of the linked list is moved to the next entry in the linked list.

Figure 5A:
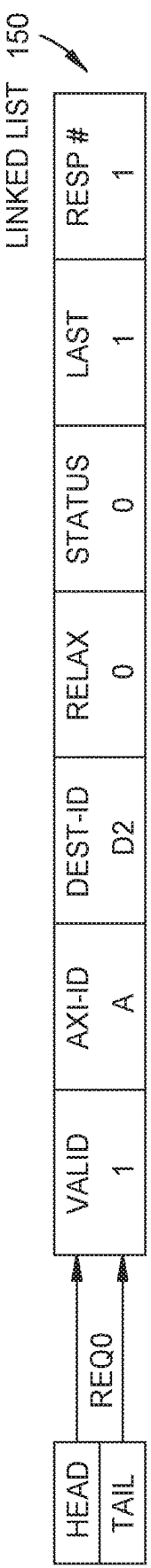
FIGS. 5A-5P illustrate states of a linked list as write requests are received and completed, according to examples.
Figure 5B:
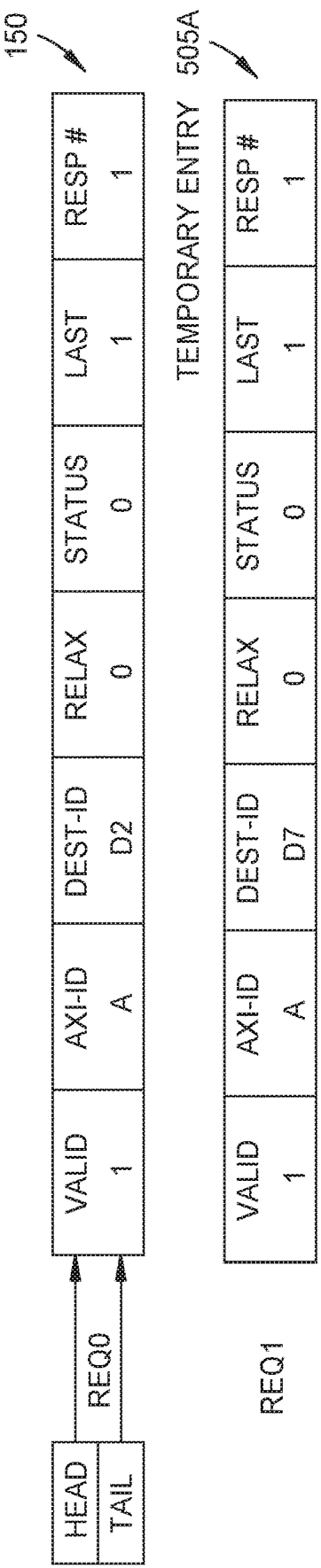
Figure 5C:
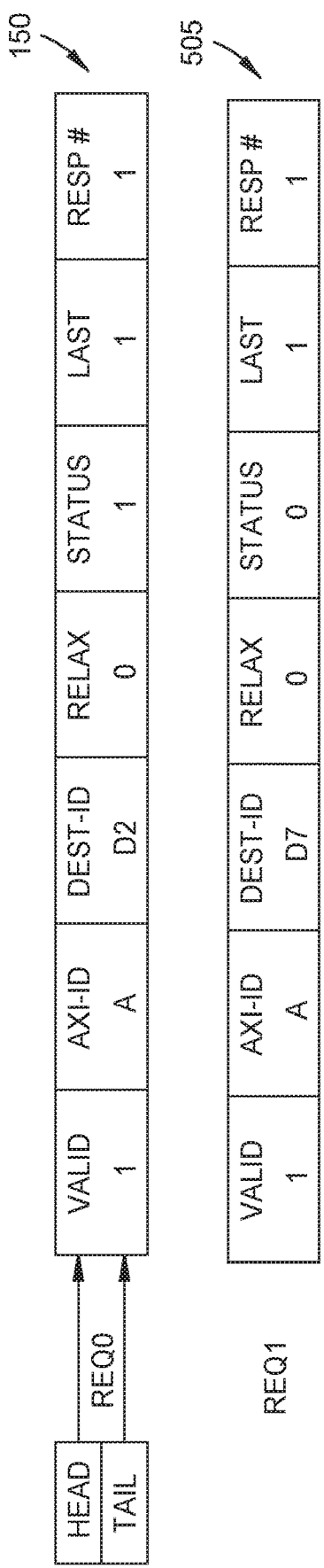

FIGS. 5A-5L illustrate states of a write tracker as requests are received and completed, according to examples. That is, FIGS. 5A-5L illustrate receiving new requests and servicing those request using the write tracker over multiple time periods. That is, FIG. 5A illustrates a first time period, FIG. 5B illustrates a second, subsequent time period, FIG. 5C illustrates a third time period subsequent to the second time period, and so forth. In one embodiment, the requests illustrated in FIGS. 5A-5L are received at the same write tracker (or the same ingress logic block), although FIG. 5L illustrates two linked list which may be managed by two different write trackers in the same ingress logic block or two different ingress logic blocks.

FIG. 5A illustrates the state of the write tracker after receiving Req0. Because there were no previous requests being serviced by the write tracker (i.e., the linked list 150 was empty), the write tracker can immediately add an entry for Req0 to the linked list 150 and transmit the request on the NoC.

As shown, the entries in FIGS. 5A-5L include a VALID section indicating whether the entry is valid, an AXI-ID section indicating the AXI ID of the ingress logic block or the write tracker(s) in the ingress logic block, a DEST-ID section indicating the egress logic block that is the destination of the request, a RELAX section indicating whether the request is strict or relaxed ordering, a STATUS section indicating whether all the response(s) for the request have been received, a LAST section indicating whether the entry is the last entry for the request, and the RESP section indicating whether the request is a single request or has been broken up into multiple sub-requests or chops. The entry illustrated in FIG. 5A is a strict ordering request (since the RELAX bit is set to 0 instead of 1) and the write tracker has yet to receive a response to the request since the value of the STATUS bit is still 0 rather than 1.

FIG. 5B illustrates the state of the write tracker after receiving Req1. The Req1 is a strict ordered request (since the RELAX bit is 0) and has a different destination than the Req0—i.e., D7 rather than D2. In this example, because the STATUS bit for Req0 is still 0, indicating the write tracker has not yet received a response to Req0, the write tracker blocks Req1 in order to maintain strict ordering. Put differently, the write tracker does not transmit Req1 on the NoC to its destination.

Further, FIG. 5B illustrates that blocked Req1 is not added to the linked list 150. Instead the write tracker stores an entry for the Req1 as a temporary entry 505A. Blocking Req1 and storing the temporary entry 505A in the write tracker is one example of the logic described in blocks 310 and 315 in the method 300.

FIG. 5C illustrates the state of the write tracker after a response from the destination of Req0 has been received. This is indicated in the entry corresponding to Req0 by the STATUS bit being changed from 0 to 1. Because a response has now been received, the write tracker can report to the entity that submitted Req0 that it has been completed, which is one example of the logic described in block 420 in the method 400. Further, receiving the response to the Req0 unblocks Req1 which is an example of the description corresponding to block 320 of the method 300.

Figure 5D:
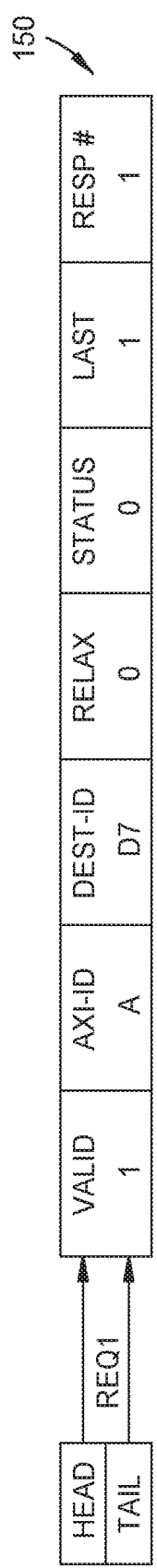

FIG. 5D illustrates the state of the write tracker after Req1 has been added to the linked list 150. That is, the entry for Req0 has been removed from the linked list 150 while the entry for Req1 has been added to the linked list 150 (and the temporary entry 505A for Req1 can be removed from the write tracker). Req1 has been transmitted to its destination (i.e., D7) but the write tracker has not yet received a response. Because Req1 is the only request currently being serviced by the write tracker, its corresponding entry is both the head and the tail of the linked list 150.

Figure 5E:
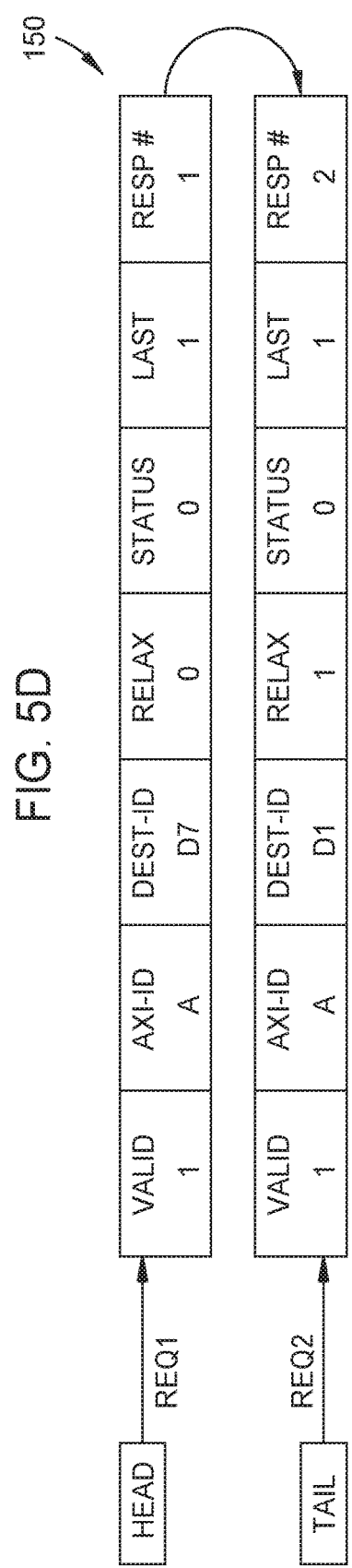

FIG. 5E illustrates the state of the write tracker after the write tracker receives Req2 which is a relaxed ordered request as indicated by the RELAX bit having a value of 1. Further, unlike Req0 and Req1, the Req2 has been divided into two chops, as indicated by the RESP section having a value of 2.

Because Req2 is a relaxed ordered request, it is not blocked by the strict ordered request Req1. Thus, the write tracker can add an entry to the tail of the linked list 150 for the Req2 and forward its two chops to their respective destinations (which may be the same destination or different destinations). That is, the two chops can be forwarded in parallel to their destinations.

In this embodiment, the two chops of Req2 are represented by the same (i.e., single) entry in the linked list 150. That is, because Req2 is a relaxed ordered request, it does not matter in what order the chops are transmitted or the order in which responses to the two chops are received at the write tracker. Thus, the write tracker can use the same entry for Req2 to ensure that it receives two response (as indicated by the RESP section) before it retires Req2, but does not care in what order the responses to the chops are received.

Figure 5F:
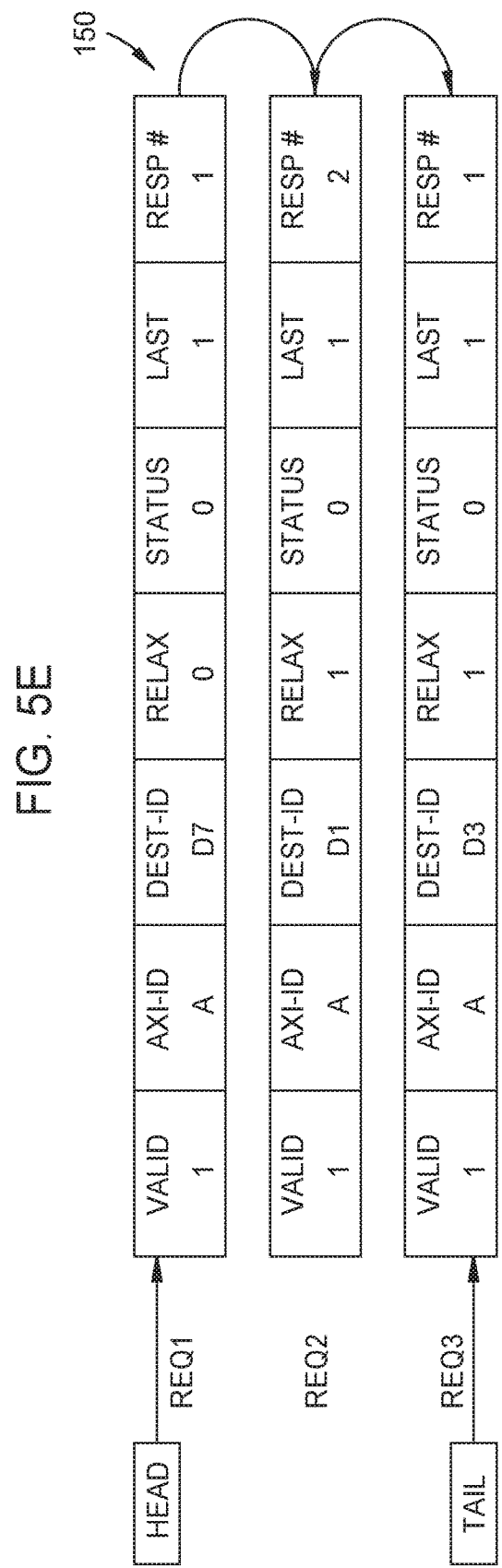

FIG. 5F illustrates the state of the write tracker after the write tracker receives Req3. As shown, Req3 is a relaxed ordered request that has only one chop (unlike Req2 which has two chops). Because Req3 is a relaxed order request, it is not blocked by any request already in the linked list 150. As such, the write tracker adds an entry for Req3 to the tail of the linked list 150 and forwards Req3 to its destination in the NoC. Thus, FIG. 5F illustrates that the write tracker has four requests pending: Req1, the two chops (or sub-requests) of Req2, and Req3.

Figure 5G:
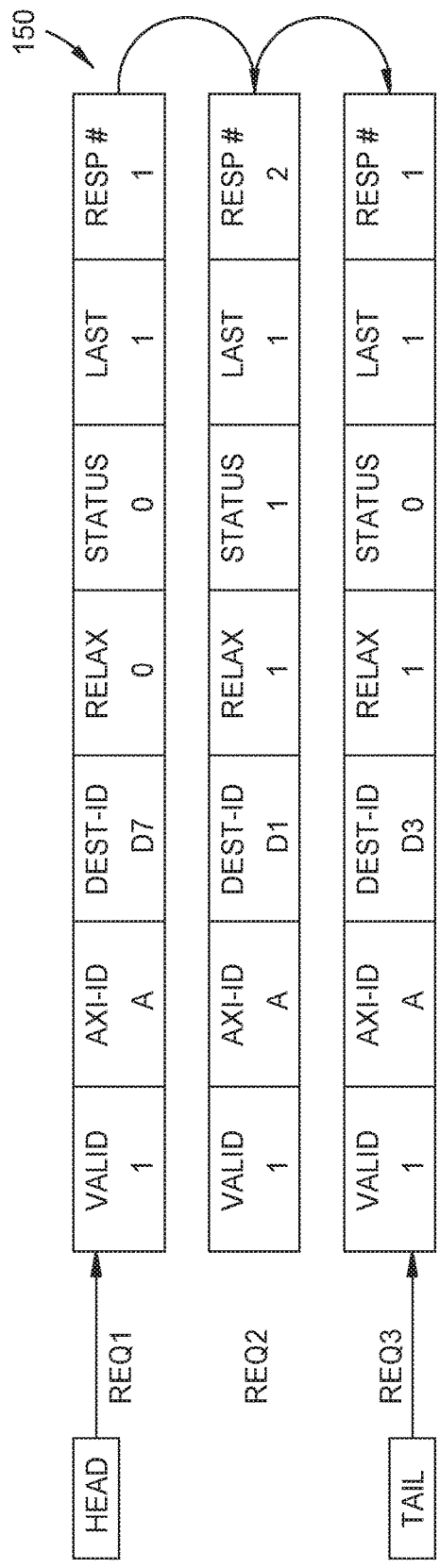

FIG. 5G illustrates the state of the write tracker after receiving both responses to the chops of Req2. In response, the STATUS bit for the entry for Req2 is changed to 1 indicating that all the responses have been received for that request. However, because Req2 is not at the head of the linked list 150 (i.e., is not the oldest received request), the write tracker cannot report the Req2 as being complete. Thus, FIG. 5G illustrates an example of the logic discussed at blocks 410 and 415 of the method 400 where the write tracker waits until all previous responses in the linked list have been reported out as being complete. But this requirement is specific to the AXI communication protocol and may not be required by other communication protocols. That is, AXI states that requests that have the same AXI ID (which all the requests stored in the linked list 150 have the same ID in this example) should be reported as complete in the order in which they are received. Thus, because the write tracker has not yet received a response from the destination of Req1, the write tracker cannot report Req2 as being complete even though it has received the responses to both of its chops. As such, the entry for Req2 remains in the linked list 150.

Figure 5H:
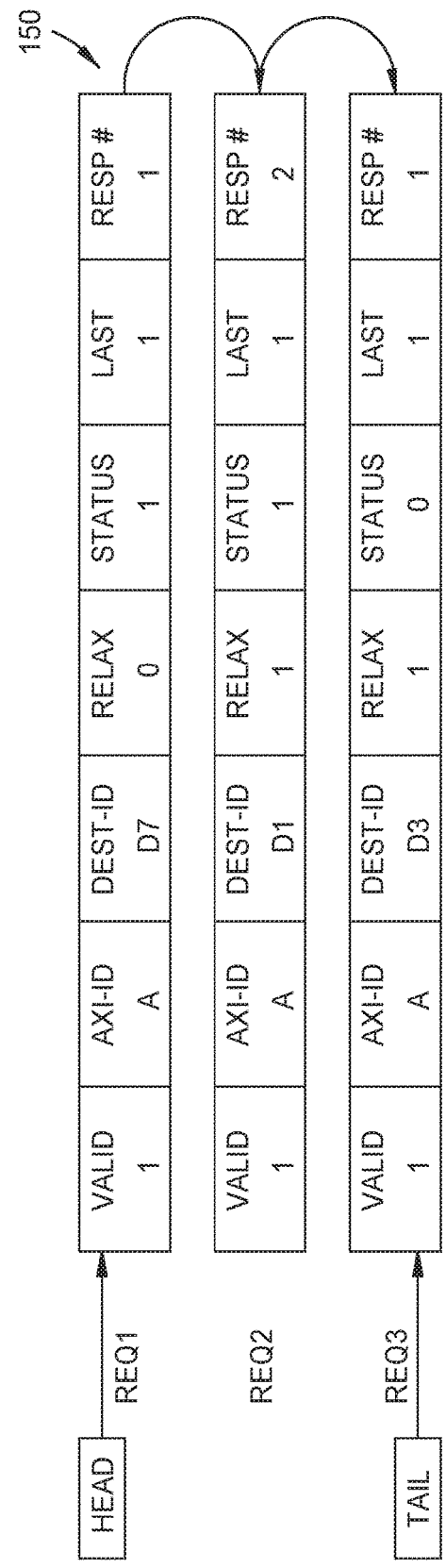

FIG. 5H illustrates the state of the write tracker after the response to the Req1 has been received. As shown, the STATUS bit for Req1 has changed from 0 to 1, and thus, Req1 can be reported as being complete to the entity that submitted the request to the ingress logic block. The entry for Req1 in the linked list 150 can be removed.

After the entry for Req1 is removed, the entry for Req2 is now the head of the linked list 150. Because the responses for Req2 have already been received (as shown in FIG. 5G), the write tracker can also report Req2 as being complete (after reporting Req1 as complete to maintain AXI response order) to the entity which submitted that request to the ingress logic block and remove the entry representing the two chops of Req2 from the linked list 150.

FIG. 5I illustrates the state of the write tracker after the entries for Req1 and Req2 have been removed from the linked list 150—i.e., these requests have been retired. As a result, the entry for Req3 is now the head and the tail of the linked list 150 since Req3 is the only request still pending in the write tracker.

FIG. 5J illustrates the state of the write tracker after receiving the Req4 that is a strict ordering request. Moreover, the Req4 is subdivided into two chops: Chop1 and Chop2. Thus, like the relaxed ordered request Req2, the Req4 has too much data to be sent in a single request through the NoC, and thus, is divided into multiple chops. In this example, the chops are sent to two different destinations: D2 and D3. For example, Req4 may be an interleaved write to two different memories.

Although Req4 is strict ordered, Req4 chop 1 is not blocked because Req3 is relaxed order. However, because the Chop2 has a different destination than Req4 Chop1, the Chop2 is blocked from being transmitted in parallel with Req4 Chop1. If the destination of both chops were to the same destination as Req4 then both of the chops of Req4 could have been transmitted in parallel with Req3. Instead, the write tracker proceeds to forward Chop1 on the NoC and stores entries for the two chops as temporary entries 505B and 505C. That is, the write tracker might not add the chops of Req4 to the linked list 150.

FIG. 5K illustrates a state of the write tracker after receiving responses to Req3 and Chop1 of Req4. That is, the STATUS bits for Req3 and Req4 Chop1 are changed to 1 indicated the write tracker has received responses from their destinations—i.e., D2 and D3. In this example, the write tracker copies the NoC response for Req4 Chop1 to the entry for Chop2 (i.e., the entry 505C).

Further, because the response for Req3 has been received, the write tracker can report that Req3 is complete and remove its entry from the linked list 150. Also, because the response to Chop1 is received, Req4 Chop2 is no longer blocked by AXI strict ordering and can be sent to the NoC.

FIG. 5L illustrates the state of the write tracker after receiving Req5, which has a different AXI ID from the previous requests received at the ingress logic block (e.g., Req0-Req4). FIG. 5L also illustrates that the temporary entries 505B-C have been combined and added to the linked list 150. That is, the linked list 150 includes an entry for Chop2 of Req4 and includes the response for Chop1, but this is not a requirement.

In this embodiment, because Req5 has a different AXI ID than the previous requests, the write tracker stores an entry for Req5 in the linked list 510. In one embodiment, the write tracker maintains a different linked list for each AXI ID. For example, an ingress logic block may correspond to multiple AXI IDs. The ingress logic block can maintain a respective linked list for each of the AXI IDs.

As mentioned above, AXI permits requests with different AXI IDs to be sent in parallel, regardless whether those requests are strict or relaxed order. That is, Req5 is never blocked by Req4 since they are assigned to different AXI IDs. Thus, the Req5 can be transmitted to the NoC without first waiting for the response to Chop2 to be received. Further, the write tracker can report receiving the responses to Req4 and Req5 in any order since they are assigned to different AXI IDs (and stored in different linked lists). That is, if the write tracker receives the response to Req5 before the response to Req4 Chop2, the write tracker can go ahead and report that Req5 is complete to the entity that submitted it without waiting first to report Req4 as being complete which is compliant with AXI.

FIG. 5M illustrates the state of the write tracker after receiving Req6, which is a strict order request. The Req6 is not blocked and can be transmitted immediately.

FIG. 5N illustrates the state of the write track after receiving Req7, a relaxed order request. Req7 includes two chops and is not blocked. Thus, it can sent immediately and added to the linked list 150.

FIG. 5O illustrates the state of the write tracker after receiving Req8, a strict order request. Further, Req8 has a block_en bit (not shown in FIG. 5O) that enforces blocking between a previous relaxed order request and a new strict order request. Thus, even though Req8 would otherwise be unblocked, the block_en bit instructs the ingress logic block to block Req8 from being transmitted. That is, because Req7 is a previously received relaxed order request, the write tracker blocks Req8. As such, Req8 is not added to the linked list 150.

FIG. 5P illustrates the state of the write tracker after completing the Req6 and Req7. That is, the write tracker has received responses from the destinations of both chops of Req7 and removed Req7 from the linked list 150. Because there are now no previously received relaxed order requests in the list 150, Req8 is unblocked so it can be transmitted to its destination.

While the foregoing is directed to specific examples, other and further examples may be devised without departing from the basic scope thereof, and the scope thereof is determined by the claims that follow.

What is claimed is:

1. An integrated circuit, comprising:
a first hardware entity;
a second hardware entity;
a network on a chip (NoC) providing connectivity between the first and second hardware entities within the integrated circuit, the NoC comprising:
an ingress logic block coupled to the first hardware entity; and
an egress logic block coupled to the second hardware entity, wherein the ingress logic block comprises a write tracker configured to:
receive a first request from the first hardware entity to write data to the second hardware entity; and
determine whether the first request is one of a relaxed ordered request or a strict ordered request, wherein the relaxed ordered request can be executed in parallel with a subsequently received strict and relaxed ordered requests while the strict ordered request can be executed in parallel with a subsequently received strict ordered request that has a same destination as the first request.

2. The integrated circuit of claim 1, wherein the write tracker is configured to:
determine that the first request is not blocked by a previous request received at the ingress logic block, wherein the previous request is a relaxed ordered request.

3. The integrated circuit of claim 2, wherein the write tracker is configured to:
upon determining the first request is not blocked, add a second entry to a tail of a linked list corresponding to the first request, wherein the linked list includes a first entry corresponding to the previous request.

4. The integrated circuit of claim 2, wherein the write tracker is configured to:
transmit the first request to the second hardware entity without waiting for a response from a destination of the previous request.

5. The integrated circuit of claim 1, wherein the write tracker is configured to:
determine that the first request is blocked by a previous request received at the ingress logic block, wherein the previous request is a strict ordered request.

6. The integrated circuit of claim 5, wherein the write tracker is configured to:
upon determining the first request is blocked, add a temporary entry corresponding to the first request;
receive a response from a destination of the previous request; and
unblock the first request and adding an entry corresponding to the first request to a linked list.

7. The integrated circuit of claim 1, wherein the strict ordered request can be executed in parallel with a subsequently received relaxed ordered request regardless of its destination, and the strict ordered request cannot be executed in parallel with a subsequently received strict ordered request that has a different destination than the first request.

8. The integrated circuit of claim 1, wherein the write tracker is configured to:
receive a response from the egress logic block after the egress logic block received the first request; and
determine whether an entry corresponding to the first request is at a head of a linked list, wherein the linked list tracks pending write requests being handled by the write tracker.

9. The integrated circuit of claim 8, wherein the write tracker is configured to:
upon determining the entry corresponding to the first request is not at the head of the linked list, wait until all previous responses represented in the linked list have been reported out; and
report the first request as being complete to the first hardware entity after determining the first request is at the head of the linked list in order to be compatible with Advanced eXtensible Interface (AXI) response order.

10. A method, comprising:
receiving a first request from a first hardware entity to write data to a second hardware entity, wherein the first hardware entity and the second hardware entity are communicatively coupled by a NoC, wherein the first hardware entity, the second hardware entity, and the NoC are in a same integrated circuit; and
determining, at an ingress logic block in the NoC, whether the first request is one of a relaxed ordered request or a strict ordered request, wherein the relaxed ordered request can be executed in parallel with a subsequently received strict and relaxed ordered requests while the strict ordered request can be executed in parallel with a subsequently received strict ordered request that has a same destination as the first request.

11. The method of claim 10, further comprising:
determining that the first request is not blocked by a previous request received at the ingress logic block, wherein the previous request is a relaxed ordered request.

12. The method of claim 11, further comprising:
upon determining the first request is not blocked, adding a second entry to a tail of a linked list corresponding to the first request, wherein the linked list includes a first entry corresponding to the previous request.

13. The method of claim 11, further comprising:
transmitting the first request to the second hardware entity via the NoC without waiting for a response from a destination of the previous request.

14. The method of claim 10, further comprising:
determining that the first request is blocked by a previous request received at the ingress logic block based on a block_en bit that enforces blocking between a previously received relaxed order request and a currently received strict order request, wherein the previous request is a relaxed ordered request.

15. The method of claim 14, further comprising:
upon determining the first request is blocked, adding a temporary entry corresponding to the first request;
receiving a response from a destination of the previous request; and
unblocking the first request and adding an entry corresponding to the first request to a linked list.

16. The method of claim 10, wherein the strict ordered request can be executed in parallel with a subsequently received relaxed ordered request regardless of its destination, and the strict ordered request cannot be executed in parallel with a subsequently received strict ordered request that has a different destination than the first request.

17. The method of claim 10, further comprising:
receiving a response from an egress logic block in the NoC after the egress logic block received the first request; and
determining whether an entry corresponding to the first request is at a head of a linked list, wherein the linked list tracks pending write requests being handled by the ingress logic block.

18. The method of claim 17, further comprising:
upon determining the entry corresponding to the first request is not at the head of the linked list, waiting until all previous responses represented in the linked list have been reported out; and
reporting the first request as being complete to the first hardware entity after determining the first request is at the head of the linked list in order to be compatible with AXI response order.

19. The method of claim 18, further comprising:
deleting the entry corresponding to the first request from the linked list.

20. The method of claim 10, further comprising:
dividing the first request into several chops transmitted on the NoC; and
waiting until response for all the chops have been received from their respective destinations before reporting the first request as being complete to the first hardware entity.

* * * * *